US006063479A

United States Patent [19]

Yoshikawa et al.

[11] Patent Number: 6,063,479

[45] Date of Patent: May 16, 2000

[54] LIGHT TRANSMITTING ELECTROMAGNETIC-WAVE SHIELDING PLATE

[75] Inventors: Masato Yoshikawa; Yasuhiro Morimura, both of Tokyo, Japan

[73] Assignee: Bridgestone Corporation, Tokyo, Japan

[21] Appl. No.: 09/146,777

[22] Filed: Sep. 8, 1998

[30] Foreign Application Priority Data

Sep. 19, 1997 [JP] Japan .................................. H9-255020
Sep. 19, 1997 [JP] Japan .................................. H9-255021

[51] Int. Cl.[7] ........................................ B32B 23/02

[52] U.S. Cl. ............................ 428/192; 428/46; 428/195; 428/323; 428/457

[58] Field of Search ............................ 428/46, 192, 195, 428/457, 323

[56] References Cited

U.S. PATENT DOCUMENTS 4,412,255 10/1983 Kuhlman et al. ........................ 358/245
5,244,708 9/1993 Tsuchida et al. ......................... 428/77

FOREIGN PATENT DOCUMENTS 9-147752 6/1997 Japan .
10 112 597 4/1998 Japan ................................ H05K 9/00
11 079 787 3/1999 Japan ............................. C03C 17/09
11 097 881 4/1999 Japan ................................ H05K 9/00
11 119 673 4/1999 Japan ................................ G09F 9/00

OTHER PUBLICATIONS

Patent Abstracts of Japan, vo. 017, No. 706(E–1483), Dec. 22, 1993 & JP 05 243784A(Yoshida Kogyo KK), Sep. 23, 1993.

Patent Abstracts of Japan, vo. 018, No. 120 (E–1516), Feb. 25, 1994 & JP 05 315791 A (Toyo commun Equip Co Ltd), Nov. 26, 1993.

Patent Abstracts of Japan, vo. 016, No. 249 (C–0948), Jun. 8, 1992 & JP 04 057875A (Shinto Paint Co Ltd), Feb. 25, 1992.

*Primary Examiner*—William Krynski
*Assistant Examiner*—B. Shewareged
*Attorney, Agent, or Firm*—Kanesaka & Takeuchi

[57] ABSTRACT

A light transmitting electromagnetic-wave shielding plate is provided which is formed of first and second transparent base plates and a transparent conductive film interposed therebetween. Conductive adhesive tapes A are bonded to cover a region from peripheral edges of the transparent conductive film to peripheral edges of the first transparent base plate via the end surfaces of the transparent base plate. This structure allows easy assemblage of the electromagnetic-wave shielding and light transmitting plate, and easy installation to a body of an equipment and provides uniform and low-resistant conduction between the light transmitting electromagnetic-wave shielding plate and the body.

6 Claims, 1 Drawing Sheet

LIGHT TRANSMITTING ELECTROMAGNETIC-WAVE SHIELDING PLATE

FIELD OF THE INVENTION

The present invention relates to an electromagnetic-wave shielding and light transmitting plate or light transmitting electromagnetic-wave shielding plate suitable for a front filter for a PDP (plasma display panel), and more particularly, to an electromagnetic-wave shielding and light transmitting plate which can be easily built in a body of an equipment such as an office automation apparatus and can provide good current conduction relative to the body of the equipment.

BACKGROUND OF THE INVENTION

With the spread of electronic appliances including office automation apparatuses and communication instruments, electromagnetic wave emission from these appliances have come into a problem. That is, adverse effect of electromagnetic wave to the human body is feared and it is also a problem that the electromagnetic wave affects precision apparatus to cause malfunction.

Therefore, plates having good electromagnetic-wave shielding efficiency and light transparency have developed as front filters for PDPs of the office automation apparatuses and come into commercial use. Such plates are also used as windows of a place where a precision apparatus is installed, such as a hospital or a laboratory in order to protect the precision apparatus from electromagnetic waves form a portable telephone.

A conventional electromagnetic-wave shielding and light transmitting plate typically comprises transparent base plates such as acrylic boards and a conductive mesh member like a wire netting and is formed by interposing the conductive mesh member between the transparent base plates and by assembling them.

In order to provide good electromagnetic-wave shielding efficiency when such an electromagnetic-wave shielding and light transmitting plate is assembled in a body of an equipment such as PDP, it is necessary to provide uniform current conduction between the electromagnetic-wave shielding and light transmitting plate and the body of the equipment, that is, between the conductive mesh of the electromagnetic-wave shielding and light transmitting plate and a conduction surface of the body.

A structure, which can provide good current conduction between an electromagnetic-wave shielding and light transmitting plate and a body of an equipment with a simple structure, has conventionally proposed (JPA 9-147752). This structure is made by forming a conductive mesh member in such a size that the periphery thereof is positioned outside of peripheral edges of transparent base plates so as to form margins when it is interposed therebetween, then folding the margins on the surface of one of the transparent base plates so that the margins function as conductive portions between the electromagnetic-wave shielding and light transmitting plate and the body of the equipment, and bonding the margins to the body of the equipment by pressure bonding.

Any combination of two transparent base plates and a conductive mesh member interposed therebetween allows the aforementioned structure in which the periphery of the conductive mesh member is positioned outside of peripheral edges of the transparent base plates so as to form margins which are then folded onto the surface of one of the transparent base plates so that the margins provide current conduction between the electromagnetic-wave shielding and light transmitting plate and the body of equipment. However, in case of two transparent base plates and a transparent conductive film interposed therebetween, the film may tear at the folded portions. In this case, therefore, the film cannot provide current conduction between the electromagnetic-wave shielding and light transmitting plate and the body of the equipment.

One of alternatives to the aforementioned transparent conductive film is a transparent conductive coating formed directly on an adhesive surface of one transparent base plate so that an electromagnetic-wave shielding and light transmitting plate is formed by the transparent base plate with the transparent conductive coating. However, in this case, the transparent conductive coating is covered by the other transparent base plate, thereby preventing the current conduction between the electromagnetic-wave shielding and light transmitting plate and the body of the equipment.

Therefore, in this case, design change is necessary, for example, making one transparent base plate in which the surface has a smaller area than that of the other transparent base plate so as to form an exposed portion of the transparent conductive coating, or forming a through hole in the transparent base plate to form a conductive path to the transparent conductive coating. Therefore, the assemblage of the electromagnetic-wave shielding and light transmitting plate and the installation thereof to the body of the equipment become complex.

OBJECT AND SUMMARY OF THE INVENTION

It is an object of the present invention to solve the above conventional problems and to provide an electromagnetic-wave shielding and light transmitting plate comprising two transparent base plates and a transparent conductive film interposed therebetween, which can be easily assembled, easily built in a body of an equipment, and can provide uniform and low-resistant conduction relative to the body of equipment.

An electromagnetic-wave shielding and light transmitting plate comprising first and second transparent base plates and a transparent conductive film interposed therebetween. At least one cross-linkable conductive adhesive tape A is bonded to cover a region from a peripheral edge of said transparent conductive film to peripheral edge of said first transparent base plate via an end surface of said first transparent base plate.

According to the present invention, the conductive adhesive tape is bonded to the peripheral edges of the transparent conductive film and also bonded to the end surfaces of the transparent base plate. Therefore, conductive portions can be easily provided without design change, such as changing the size of the transparent base plate or forming a through hole in the transparent base. Further, this structure allows easy assemblage of the electromagnetic-wave shielding and light transmitting plate and easy installation to a body of an equipment, and provides uniform and low-resistant conduction between the electromagnetic-wave shielding and light transmitting plate and the body through the conductive adhesive tape.

According to the present invention, it is preferable that a cross-linkable conductive adhesive tape B is bonded to cover end surfaces of the first and second transparent base plates and peripheral edges at the surfaces of said first and second transparent base plates. This improves the strength of the electromagnetic-wave shielding and light transmitting plate to also improve its handling, thereby further facilitating the installation to the body of the equipment and ensuring the uniform and stabilized conduction.

DETAILED DESCRIPTION OF PREFERRED EMBODIMENT

Hereinafter, an embodiment of an electromagnetic-wave shielding and fight transmitting plate of the present invention will be described with reference to the drawings.

Figure 1A:
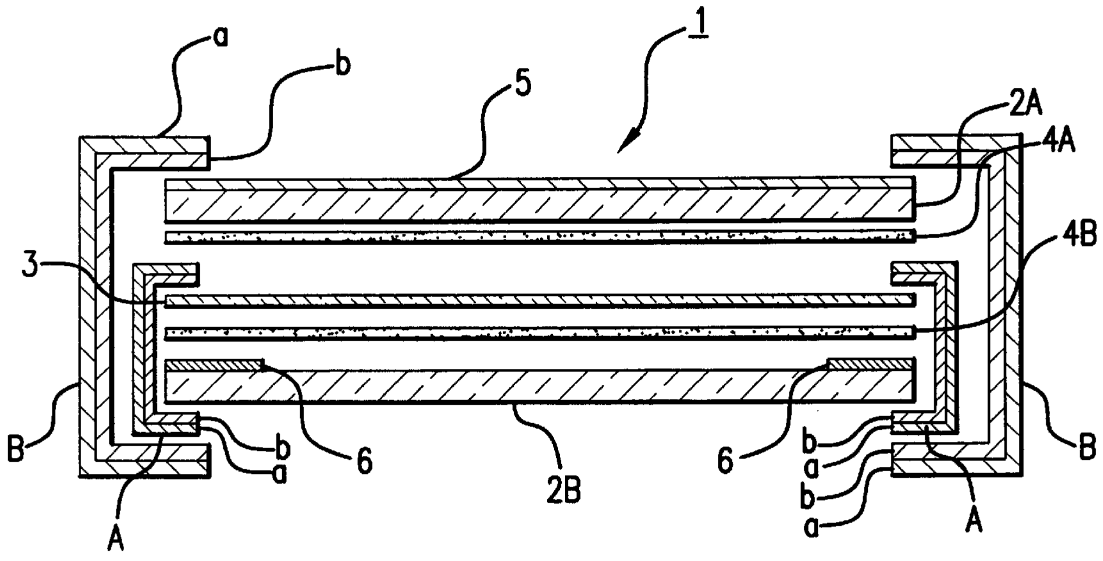
FIG. 1*a* is a schematic sectional view showing an embodiment of an electromagnetic-wave shielding and light transmitting plate according to the present invention and FIG. 1*b* is a plan view showing a transparent conductive film onto which conductive adhesive tapes adhere.
Figure 1B:
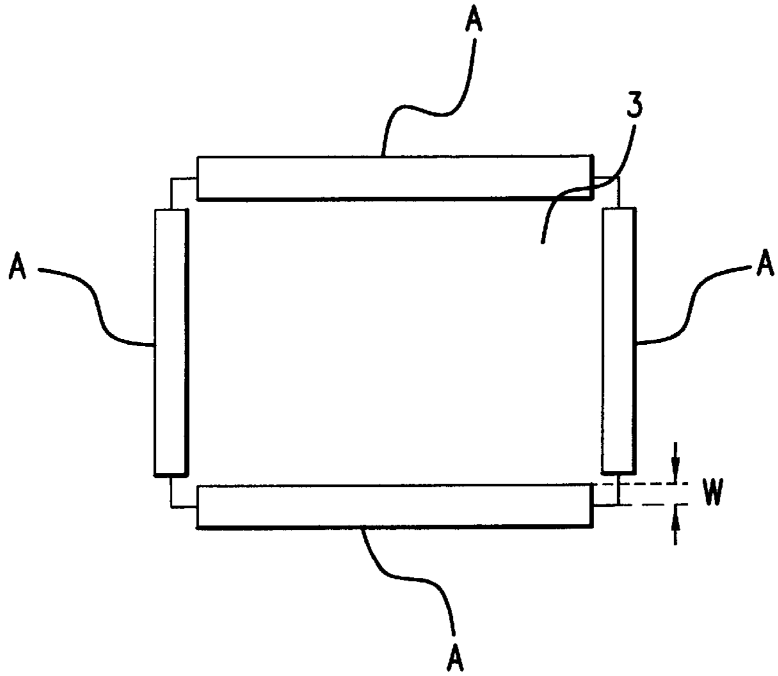

FIG. 1*a* is a schematic sectional view showing the embodiment of the electromagnetic-wave shielding and light transmitting plate of the present invention and FIG. 1*b* is a plan view showing a transparent conductive film onto which conductive adhesive tapes adhere.

The electromagnetic-wave shielding and light transmitting plate 1 comprises two transparent base plates 2A, 2B and a transparent conductive film 3. The transparent conductive film 3 is interposed between the transparent base plates 2A, 2B and is integrally bonded together by adhesive resin films 4A, 4B to form an assembled member. Conductive adhesive tapes A are bonded to a region from four side edges of the transparent conductive film 3 to peripheral edges at the front side of the transparent base plate 2B, respectively.

In this embodiment, a conductive adhesive tape B is further bonded to all around ends of the assembled member of the transparent base plates 2A, 2B and the transparent conductive film 3 in such a manner as to cover corners between surfaces and the end faces so that the conductive adhesive tape B is bonded to outside edges of both transparent base plates 2A, 2B.

The conductive adhesive tapes A, B are formed, for example, by laying a conductive adhesive layer b on one surface of a metallic foil a. The metallic foil a for the conductive adhesive tapes A, B may have a thickness of 1 to 100 μm and may be made of metal such as copper, silver, nickel, aluminum, or stainless steel.

The conductive adhesive layer b is formed by applying an adhesive material, in which conductive particles are dispersed, onto one surface of the metallic foil a.

Examples of the adhesive material include epoxy or phenolic resin containing hardener, acrylic adhesive compound, rubber adhesive compound, silicone adhesive compound and the like.

Conductive materials of any type having good electrical continuities may be employed as the conductive particles to be dispersed in the adhesive. Examples include metallic powder of, for example, copper, silver, and nickel, metallic oxide powder of, for example, tin oxide, tin indium oxide, and zinic oxide, and resin or ceramic powder coated with such a metal or metallic oxide as mentioned above. There is no specific limitation on its configuration so that the particles may have any configuration such as palea-like, dendritic, granular, pellet-like, spherical, stellar, or confetto-like (spherical with many projections) configuration.

The content of the conductive particles is preferably 0.1–15% by volume relative to the adhesive and the average particle size is preferably 0.1–100 μm.

The thickness of the adhesive layer b is in a range from 5 to 100 μm in a normal case.

According to the present invention, the conductive adhesive tape may be a cross-linkable conductive adhesive tape.

Use of the conductive adhesive tape of cross-linked type, in particular, having a post-cross-linkable adhesive layer containing ethylene-vinyl acetate copolymer and cross-linking agent for the ethylene-vinyl acetate copolymer enables effective assemblage because of the following characteristics:

(i) good adhesion properties, thereby allowing easy temporal adhesion to an adherend with suitable tack;

(ii) suitable tackiness before cross-linking, i.e. enough for the temporal adhesion but not so strong as to allow re-adhesion, thereby facilitate the amendment;

(iii) very strong tackiness after cross-linking, thereby exhibiting high bond strength;

(iv) high moisture and heat resistance, thereby exhibiting high durability; and (v) cross-linkable at a temperature lower than 130° C. in case of thermal cross-linking and cross-linkable even with light. The cross linking can be conducted at a relatively low temperature, thereby facilitating the adhesion operation.

Hereinafter, the structure of the cross-linkable conductive tape suitable for the present invention will be described.

The cross-linkable conductive tapes A, B used in the present invention preferably comprises a metallic foil a and an adhesive layer b, in which conductive particles are dispersed to be disposed on one surface of the metallic foil a, wherein the adhesive layer b is a post-cross-linkable adhesive layer including polymer, in which the principal component is ethylene-vinyl acetate copolymer, and a cross-linking agent for the ethylene-vinyl acetate copolymer.

Examples of the conductive particles to be dispersed in the adhesive layer b include the examples given for the conductive particles to be dispersed in the adhesive of the aforementioned conductive adhesive tapes A, B.

The content of the conductive particles is preferably 0.1–15% by volume relative to the polymer, described later, forming the adhesive layer b and the average particle size is preferably 0.1–100 μm. Such limitation on the content and the particle size prevents condensation of the conductive particles, thereby providing good current conduction.

The polymer forming the adhesive layer b preferably contains, as the principal component thereof, ethylene-vinyl acetate copolymer selected from the following (I) through (III) and has melt index (MFR) from 1 to 3000, preferably from 1 to 1000, and more preferably from 1 to 800.

Use of the following copolymers (I) through (III), in which MFR is in a range from 1 to 3000 and vinyl acetate content is in a range from 2 to 80% by weight, improves tackiness before cross-linking to improve the working efficiency and rises the three-dimensional cross-linking density after cross-linking, thereby exhibiting quite high bond strength and also improving the moisture and heat resistance:

(I) ethylene-vinyl acetate copolymer in which vinyl acetate content is in a range from 20 to 80% by weight;

(II) copolymer of ethylene, vinyl acetate, acrylate and/or methacrylate monomer, in which vinyl acetate content is in a range from 20 to 80% by weight, and acrylate and/or methacrylate monomer content is in a range from 0.01 to 10% by weight; and (III) copolymer of ethylene, vinyl acetate, maleic acid and/or maleic anhydride, in which vinyl acetate content is in a range from 20 to 80% by weight, and maleic acid and/or maleic anhydride content is in a range from 0.01 to 10% by weight.

In the ethylene-vinyl acetate copolymers of (I) through (III), the content of vinyl acetate is in a range from 20 to 80% by weight, preferably from 20 to 60% by weight. Less than 20% by weight of vinyl acetate interferes with the exhibition of sufficient cross-linking in case of cross-linkage at high temperature, while more than 80% by weight decreases the softening temperature of resin in case of the ethylene-vinyl acetate copolymers of (I), (II), thereby making the storage difficult that is a problem in practical use, and tends to decrease the bond strength and the durability in case of the ethylene-vinyl acetate copolymer of (III).

In the copolymer of ethylene, vinyl acetate, acrylate and/or methacrylate monomer of (II), the content of the acrylate and/or methacrylate monomer is in a range from 0.01 to 10% by weight, preferably from 0.05 to 5% by weight. Less than 0.01% by weight of the monomer decreases the improvement of the bond strength, while more than 10% by weight tends to affect the workability. Examples of the acrylate and/or methacrylate monomer include monomers chosen from a group of acrylic ester and/or methacrylate ester monomers. Preferably employed as such a monomer is ester of acrylic acid or methacrylic acid and substituted aliphatic alcohol having non-substituting group or substituting group, such as epoxy group, including carbon atoms 1 through 20, particularly, 1 through 18. Examples include methyl acrylate, methyl methacrylate, ethyl acrylate, and glycidyl methacrylate.

In the copolymer of ethylene, vinyl acetate, maleic acid and/or maleic anhydride of (III), the content of the maleic acid and/or maleic anhydride is in a range from 0.01 to 10% by weight, preferably from 0.05 to 5% by weight. Less than 0.01% by weight of the content decreases the improvement of the bond strength, while more than 10% by weight tends to affect the workability.

The polymer according to the present invention contains more than 40% by weight, particularly more than 60% by weight, of the ethylene-vinyl acetate copolymer of (I) through (III) and preferably consists of the ethylene-vinyl acetate copolymer of (I) through (III) without other component. When the polymer contains polymer besides the ethylene-vinyl acetate copolymer, the polymer besides the ethylene-vinyl acetate copolymer may be olefin polymer of which backbone contains more than 20 mole % of ethylene and/or propylene, polyvinyl chloride, acetal resin, or the Like. The crosslinking agent for the aforementioned polymer may be organic peroxide as a crosslinking agent for heat curing to form a thermosetting adhesive layer or may be photosensitizer as a crosslinking agent for photo-curing to form a photo-curing adhesive layer.

Such organic peroxide may be any organic peroxide that can be decomposed at a temperature above 70° C. to generate radical, preferably organic peroxide of which decomposition temperature during half-life period of 10 hours is higher than 50° C., and should be selected according to the temperature for applying the adhesive material, the preparation condition, the storage stability, the temperature for curing (bonding), and the heat resistance of the adherend.

Examples of available peroxide includes 2,5-dimethylhexane-2,5-dihydro peroxide; 2,5-dimethyl-2,5-di (tert-butyl-peroxy)-hexane-3; di-tert-butyl peroxide; tert-butylcumyl peroxide; 2,5-dimethyl-2,5-di (tert-butyl-peroxy)-hexane; dicumyl peroxide; α,α'-bis (tert-butyl peroxy)-benzene; n-buthyl-4,4-bis (tert-butyl-peroxy)-valerate; 2,2-bis (tert-butyl-peroxy)-butane, 1,1-bis (tert-butyl-peroxy)-cyclohexane; 1,1-bis (tert-butyl-peroxy)-3,3,5-trimethylcyclohexane; tert-butyl peroxy benzoate; benzoyl peroxide; tert-butyl peroxy acetate; methyl ethyl ketone peroxide; 2,5-dimethylhexyl-2,5-bis-peroxy-benzoate; butyl hydroperoxide; p-menthane hydroperoxide; p-chlorbenzoyl peroxide; hydroxyheptyl peroxide; chlorhexanon peroxide; octanoyl peroxide; decanoyl peroxide; lauroyl peroxide; cumyl peroxy octoate; succinic acid peroxide; acetyl peroxide; tert-butyl-peroxy (2-ethylhexanoate); m-toluoyl peroxide; tert-butyl-peroxyisobutyrate; and 2,4-dichlorobenzoyl peroxide. These are used alone or in mixed state, normally from 0.1 to 10% by weight relative to the aforementioned polymer.

On the other hand, suitably employed as such photosensitizer (photopolymerization initiator) is radical photopolymerization initiator. Available hydrogen-drawn type initiators among radical photopolymerization initiators include benzophenone; methyl o-benzoylbenzoate; 4-benzoyl-4'-methyl diphenyl sulfide; isopropylthioxanthone; diethylthioxanthone; and 4-(diethylamino) ethyl benzoate. Among radical photopolymerization initiators, intramolecular cleavage type initiators include benzoin ether, benzoin propyl ether, and benzyldimethl ketal, α-hydroxyalkyphenon type initiators include 2-hydroxy-2-methyl-1-phenylpropane-1-on, 1-hydroxycyclohexyl phenyl ketone, alkyl phenyl glyoxylate, and diethoxy acetophenone, α-amino-alkylphenone type initiators include 2-methyl-1-[4-(methylthio) phenyl]-2-morpholino propane-1, and 2-benzyl-2-dimethylamino-1-(4-morpholino phenyl) butanone-1, and acylphosphine oxide may be employed. These are used alone or in mixed state, normally from 0.1 to 10% by weight relative to the aforementioned polymer.

The adhesive layer according to the present invention preferably includes a silane coupling agent as adhesive accelerator. Examples of the silane coupling agent include vinyltriethoxysilane, vinyl-tris (β-methoxyethoxy) silane, γ-methacryloxypropyl trimethoxy silane, vinyltriacetoxy silane, γ-glycidoxypropyltrimetoxysilane, γ-glycidoxypropyltrietoxysilane, β-(3,4-epoxycyclohexyl) ethyl trimethoxy silane, vinyltrichlorosilane, γ-mercaptopropyl trimethoxy silane, γ-aminopropyl triethoxy silane, and N-(β-aminoethyl)-γ-aminopropyl trimethoxy silane. These are used alone or in the mixed state, normally from 0.1 to 10% by weight relative to the aforementioned polymer.

The adhesive accelerator may contain epoxy group containing compound. Examples of epoxy group containing compound include triglycidyl tris(2-hydroxy ethyl) isocyanurate, neopentyl glycol diglycidyl ether, 1,6-hexane diol diglycidyl ether, alyl glycidyl ether, 2-ethyl hexyl glycidyl ether, phenyl glycidyl ether, phenol $(EO)_5$ glycidyl ether, p-tert-butyl phenyl glycidyl ether, diglycidylester adipate, diglycidylester phthalate, glycidyl methacrylate, and butyl glycidyl ether. The same effect can be obtained by alloying polymer containing epoxy group. These epoxy group containing compounds are used alone or in the mixed state, normally from 0.1 to 20% by weight relative to the aforementioned polymer.

In order to improve the properties (such as mechanical strength, adhesive property, optical property, heat resistance, moisture resistance, weatherability, and crosslinking speed) of the adhesive layer, a compound containing one selected from acryloxy group or methacryloxy group and one selected from allyl group may be added into the adhesive layer.

Such a compound used for this purpose is usually acrylic acid or methacrylic acid derivative, for example, ester or amide thereof. Examples of ester residues include alkyl group such as methyl, ethyl, dodecyl, stearyl, and lauryl and, besides such alkyl group, cycloxyhexyl group, tetrahydrofurfuryl group, aminoethyl group, 2-hydroethyl, 3-hydroxypropyl group, and 3-chloro-2-hydroxypropyl group. Ester with polyfunctional alcohol such as ethylene glycol, triethylene glycol, polypropylene glycol, polyethylene glycol, trimethylolpropane, or pentaerythritol may be also employed. The typical one of such amide is diacetone acrylamide. Examples of polyfunctional crosslinking aid include acrylic ester or methacrylate ester such as trimethylolpropane, pentaerythritol, glycerin, and compounds having allyl group such as triallyl cyanurate, triallyl isocyanurate, diallyl phthalate, diallyl isophthalate, and diallyl maleate. These are used alone or in the mixed state, normally from 0.1 to 50% by weight, preferably from 0.5 to 30% by weight relative to the aforementioned polymer. More than 50% by weight of the content sometimes affects the working efficiency during preparation and the applying efficiency of the adhesive material.

In order to improve the workability and the ply adhesion of the adhesive layer, hydrocarbon resin may be added into the adhesive layer. Such hydrocarbon resin to be added for this purpose may be either natural resin or synthetic resin. Examples suitably employed as natural resin are rosin, rosin derivative, and terpene resin. Employed as rosin may be gum rosin, tall oil rosin, or wood rosin. Employed as rosin derivative is rosin which has been hydrogenated, disproportioned, polymerized, esterifyed, or metallic chlorinated. Employed as terpene resin may be terpene resin, such as α-pinene and β-pinene (nopinene), or terpene phenol resin. Besides the above natural resin, dammar, copal, or shellac may be employed. Examples suitably employed as synthetic resin are petroleum resin, phenolic resin, and xylene resin. Employed as petroleum resin may be aliphatic petroleum resin, aromatic petroleum resin, cycloaliphaticb petroleum resin, copolymer petroleum resin, hydrogenated petroleum resin, pure monomer petroleum resin, or coumarone-indene resin. Employed as phenolic resin may be alkylphenolic resin or modified phenolic resin. Employed as xylene resin may be xylene resin or modified xylene resin. The content of the hydrocarbon resin should be suitably selected, preferably from 1 to 200% weight, more preferably from 5 to 150% weight relative to the polymer.

The adhesive layer may further include antioxidant, ultraviolet absorbing agent, dye, and/or processing aid in such an amount not to affect the object of the present invention.

Examples of metal of the metallic foil a as the base of the cross-linkable conductive adhesive tapes A, B of the present invention include copper, silver, nickel, aluminum, or stainless steel. The thickness of the metallic foil a is normally in a range from 1 to 100 μm.

The adhesive layer b is made of mixture in which the ethylene-vinyl acetate copolymer, cross-linking agent, other additives if necessary, and conductive particles are mixed uniformly in a predetermined ratio, and can be easily formed by applying the mixture onto the metallic foil a using a roll coater, a die coater, a knife coater, a micabar coater, a flow coater, a spray coater or the like.

The thickness of the adhesive layer b is normally in a range from 5 to 100 μm.

In the electromagnetic-wave shielding and light transmitting plate of the present invention, examples of a material of the transparent base plates 2A, 2B include glass, polyester, polyethylene terephthalate (PET), polybutylene terephthalate, polymethyl methacrylate (PMMA), acrylic board, polycarbonate (PC), polystyrene, triacetate film, polyvinyl alcohol, polyvinyl chloride, polyvinylidene chloride, polyethylene, ethylene-vinyl acetate copolymer, polyvinylbutyral, metal ionic cross-linked ethylene-methacrylic copolymer, polyurethane, and cellophane. Preferably selected from the above materials are glass, PET, PC, and PMMA.

The thicknesses of the transparent base plates 2A, 2B are suitably determined in accordance with requirements (e.g. strength, light weight) due to the application of a plate to be obtained and are normally in a range from 0.1 to 10 mm.

The transparent base plates 2A, 2B are not necessarily made of the same material. For example, in a case of a PDP front filter in which only the front surface is required to have scratch resistance and durability, the transparent base plate 2A as the front surface may consist of a glass plate having a thickness of 1.0 to 10 mm and the transparent base plate 2B as the rear surface (at the electromagnetic wave source side) may consist of a PET film or PET board, an acrylic film or acrylic board, or a polycarbonate film or polycarbonate board having a thickness of 1 μm to 10 mm.

In the electromagnetic-wave shielding and light transmitting plate of this embodiment, acrylic resin-based black painting 6 is provided in a flame shape on the peripheral portion of the rear surface of the transparent base plate 2B.

In the electromagnetic-wave shielding and light transmitting plate 1 of this embodiment, an antireflection film 5 is formed on the surface of the transparent base plate 2A as the front surface. The antireflection film 5 formed on the surface of the transparent base plate 2A is a laminated film of a high-refractive transparent film and a low-refractive transparent film and examples of the laminated film are as follows:

(1) a laminated film consisting of a high-refractive transparent film and a low-refractive transparent film, i.e. two films in total;

(2) a laminated film consisting of two high-refractive transparent films and two low-refractive transparent films which are alternately laminated, i.e. four films in total;

(3) a laminated film consisting of a medium-refractive transparent film, a high-refractive transparent film, and a low-refractive transparent film, i.e. three films in total; and (4) a laminated film consisting of three high-refractive transparent films and three low-refractive transparent films which are alternately laminated, i.e. six films in total.

As the high-refractive transparent film, a film, preferably a transparent conductive film, having a refractive index of 1.8 or more can be made of ZnO, $TiO_2$, $SnO_2$, or ZrO in which ITO (tin indium oxide) or ZnO, A1 is doped. On the other hand, as the low-refractive transparent film, a film can be made of low-refractive material having a refractive index of 1.6 or less such as $SiO_2$, $MgF_2$, or $A1_2O_3$. The thicknesses of the films vary according to the film structure, the film kind, and the central wavelength because the refractive index in a visible-light area is reduced by interference of light. In case of four-layer structure, the antireflection film is formed in such a manner that the first layer (high-refractive transparent film) is from 5 to 50 nm, the second layer (low-refractive transparent film) is from 5 to 50 nm, the third layer (high-refractive transparent film) is from 50 to 100 nm, and the fourth layer (low-refractive transparent film) is from 50 to 150 nm in thickness.

The antireflection film may be further formed with an antifouling film to improve the fouling resistance of the surface. The antifouling film is preferably a fluorocarbon or silicone film having a thickness in a range from 1 to 1000 nm. The transparent base plate 2A as the front surface of the electromagnetic-wave shielding and light transmitting plate of the present invention may be further processed by hard coating with silicone material and/or anti-glare finish by hard coating including light-scattering agent. On the other hand, the transparent base plate 2B as the rear surface may be processed by heat ray reflection coating with a metallic film or a transparent conductive film to improve its function. A transparent conductive film may also be formed on the transparent base plate 2A as the front surface.

The transparent conductive film 3 to be interposed between the transparent base plates 2A, 2B may be a resin film in which conductive particles are dispersed. The conductive particles may be any particles having conductivity and the following are examples of such conductive particles.

(i) carbon particles or powder;

(ii) particles or powder of metal such as nickel, indium, chromium, gold, vanadium, tin, cadmium, silver, platinum, aluminum, copper, titanium, cobalt, or lead, alloy thereof, or conductive oxide thereof; and (iii) particles made of plastic such as polystyrene and polyethylene, which are surfaced with a coating layer of a conductive material from the above (i) and (ii).

Because the conductive particles of large particle diameter affect the light transparency and the thickness of the transparent conductive film 3, it is preferable that the particle diameter is 0.5 mm or less. The preferable particle diameter of the conductive particles is between 0.01 and 0.5 mm.

The high mixing ratio of the conductive particles in the transparent conductive film 3 spoils the light transparency, while the low mixing ratio makes the electromagnetic-wave shielding efficiency short. The mixing ratio of the conductive particles is therefore preferably between 0.1 and 50% by weight, particularly between 0.1 and 20% by weight and more particularly between 0.5 and 20% by weight, relative to the resin of the transparent conductive film 3.

The color and the luster of the conductive particles can be suitably selected according to the application. In a case of a display filter, conductive particles having a dark color such as black or brown and dull surfaces are preferable. In this case, the conductive particles can suitably adjust the light transmittance of the filter so as to make the display easy-to-see.

Examples of matrix resin of the transparent conductive film include polyester, polyethylene terephthalate (PET), polybutylene terephthalate, polymethyl methacrylate (PMMA), acrylic board, polycarbonate (PC), polystyrene, triacetate film, polyvinyl alcohol, polyvinyl chloride, polyvinylidene chloride, polyethylene, ethylene-vinyl acetate copolymer, polyvinylbutyral, metal ionic cross-linked ethylene-methacrylic copolymer, polyurethane, and cellophane. Preferably selected from the above resins are PET, PC, and PMMA.

The thickness of the transparent conductive film 3 is suitably determined in accordance with requirements due to the application of the electromagnetic-wave shielding and light transmitting plate and are normally in a range from 0.01 $\mu$m to 5 $\mu$m. The thickness less than 0.01 $\mu$m is too thin for the conductive layer for electromagnetic-wave shielding so as not to provide sufficient electromagnetic-wave shielding efficiency, while the thickness exceeding 5 $\mu$m may spoil the light transparency.

The electromagnetic-wave shielding and light transmitting plate 1 shown in FIGS. 1*a*, 1*b* comprises a transparent base plate 2A on which an antireflection film 5 is applied, a transparent base plate 2B on which a black painting 6 is applied, a transparent conductive film 3, adhesive resin films 4A, 4B, and conductive adhesive tapes or cross-linkable conductive adhesive tapes A, B. The transparent conductive film 3 is overlaid on the transparent base plate 2B through the adhesive resin film 4B to form a pre-assembled member. The conductive adhesive tapes A are bonded to the pre-assembled member. Alternatively, the cross-linkable adhesive tapes A are bonded to the side edges of the transparent adhesive film 3 and are crosslinked by thermo compression bonding using, for example, a heat sealer so as to provide conduction between the film and the metallic foil, and then the transparent adhesive film is overlaid on the transparent base plate 2B through the adhesive resin film 4B to form a pre-assembled member. After that, the transparent base plate 2A and the adhesive resin film 4A are overlaid on the pre-assembled member and are heated or radiated with light with some pressures according to the hardening requirement of the adhesive resin film to form an assembled member. Moreover, the conductive adhesive tape or cross-linkable conductive adhesive tape B is bonded over a region from the edges of the surface of the transparent base plate 2A to the edges of the surface of the transparent base plate 2B. In this manner, the electromagnetic-wave shielding and light transmitting plate is easily made.

The cross-linkable conductive adhesive tapes A, B are bonded to an adherend by tackiness of the adhesive layer thereof (this temporal adhesion allow re-adhesion, if necessary) and then heated or radiated with ultraviolet with some pressures, if necessary. In case of ultraviolet radiation, heating may be also performed. The cross-linkable conductive tapes may be partially bonded by partially heating or radiating ultraviolet.

The thermo compression bonding can be easily conducted by a normal heat sealer. As one of compression and heating methods, a method may be employed that the integrated member bonded with the cross-linkable conductive adhesion tape is inserted into a vacuum bag which is then vacuumed and after that is heated. Therefore, the bonding operation is quite easy.

The bonding condition in case of thermal cross-linking depends on the type of a crosslinking agent (organic peroxide) to be employed. The cross-linking is conducted normally at a temperature from 70 to 150° C., preferably from 70 to 130° C. and normally for 10 seconds to 120 minutes, preferably 20 seconds to 60 minutes.

In case of optical cross-linking, many light sources emitting a ultraviolet in to visible range may be employed. Examples include an extra-high pressure, high pressure, or low pressure mercury lamp, a chemical lamp, a xenon lamp, a halogen lamp, a Mercury halogen lamp, a carbon arc lamp, an incandescent lamp, and a laser radiation. The period of radiation is not limited because it depends on the type of lamp and the strength of the light source, but normally in a range from dozens of seconds to dozens of minutes. In order to aid the cross-linking, ultraviolet may be radiated after previously heating to 40–120° C.

The pressure for bonding should be suitably selected and is preferably 0–50 kg/cm$^2$, particularly 0–30 kg/cm$^2$.

The width (designated by W in FIG. 1*b*) of adhering portions of the conductive adhesive tapes or cross-linkable conductive adhesive tapes A at the edges of the transparent conductive film 3 depends on the area of the electromagnetic-wave shielding and light transmitting plate and usually in a range from 3 to 20 mm.

As mentioned above, the electromagnetic-wave shielding and light transmitting plate with the conductive adhesive tapes or cross-linkable conductive adhesive tapes A, B can be quite easily built in a body of a equipment only by fitting into the body and can provide uniform and god current conduction between the transparent conductive film 3 and the body of equipment through the conductive adhesive tapes or cross-linkable conductive adhesive tapes A, B on four sides of the plate, thereby exhibiting high electromagnetic-wave shielding efficiency.

The electromagnetic-wave shielding and light transmitting plate shown in FIGS. 1*a*, 1*b* is only one of examples of the electromagnetic-wave shielding and light transmitting plate of the present invention, so that the present invention is not limited thereto. For example, the conductive adhesive tapes or cross-linkable conductive adhesive tapes A, B are bonded to four side edges of the transparent conductive film 3 in the illustrative embodiment, but may be bonded to only two side edges opposite to each other. It should be understood that the bonding on four-side edges is better in view of uniform current conduction.

In addition, the electromagnetic-wave shielding and light transmitting plate of the present invention is not limited to that comprising two transparent base plates and a transparent conductive film interposed therebetween as shown in FIGS. 1*a*, 1*b*. The electromagnetic-wave shielding and light transmitting plate may be formed by using one transparent base plate on which a transparent conductive film is directly formed and by integrating the transparent base plate and the other transparent base plate with an adhesive resin film. In this case, formed on the transparent plate is a transparent conductive film as follows:

(1) a metallic film formed in a lattice or punching metal-like arrangement on the plate surface of the transparent base plate by pattern etching, comprising steps of coating with photo-resist, exposing a pattern, and developing the pattern.

(2) a printing film formed in a lattice or punching metal-like arrangement on the plate surface of the transparent base plate by printing a pattern with conductive ink.

In the electromagnetic-wave shielding and light transmitting plate of the present invention, metallic foil which is formed in lattice or punching metal-like arrangement by pattern etching may be used in place of the transparent conductive film of the electromagnetic-wave shielding and light transmitting plate shown in FIGS. 1*a*, 1*b*. Also in this case, the metallic foil is easy to tear at the folded portion. Without folding the metallic foil, current conduction can be easily provided.

The electromagnetic-wave shielding and light transmitting plate of the present invention as mentioned above is quite suitable for a front filter of PDP and a window of a place where a precision apparatus is installed, such as a hospital or a laboratory.

As mentioned above, the electromagnetic-wave shielding and light transmitting plate of the present invention can be easily assembled and easily built in a body of an equipment as an object of installation and can provide uniform and low-resistant conduction relative to the body of the equipment, thereby exhibiting high electromagnetic-wave shielding efficiency.

What is claimed is:

1. A light transmitting electromagnetic-wave shielding plate comprising first and second transparent base plates, a transparent conductive film interposed therebetween, at least one first cross-linkable conductive adhesive tape which is bonded to cover a region from a peripheral edge of said transparent conductive film to a peripheral edge of said first transparent base plate via an end surface of said first transparent base plate.

2. A light transmitting electromagnetic-wave shielding plate as claimed in claim 1, further comprising a second cross-linkable conductive adhesive tape which is bonded to cover end surfaces of said first and second transparent base plates and peripheral edges of said first and second transparent base plates.

3. A light transmitting electromagnetic-wave shielding plate as claimed in claim 1, wherein the first conductive adhesive tape is a cross-linkable conductive adhesive tape.

4. A light transmitting electromagnetic-wave shielding plate as claimed in claim 2, wherein the second conductive adhesive tape is a cross-linkable conductive adhesive tape.

5. A light transmitting electromagnetic-wave shielding plate as claimed in claim 3, wherein said cross-linkable conductive adhesive tape comprises a metallic foil and an adhesive layer, in which conductive particles are dispersed to be disposed on said metallic foil, and wherein said adhesive layer is a post-cross-linkable adhesive layer containing polymer in which a principal component is ethylene-vinyl acetate copolymer and a cross-linking agent for said copolymer.

6. A light transmitting electromagnetic-wave shielding plate as claimed in claim 5, wherein said polymer contains, as the principal component, ethylene-vinyl acetate copolymer selected from the group consisting of followings (I) through (III), and has melt index from 1 t 3000;

(I) ethylene-vinyl acetate copolymer in which a vinyl acetate content is in a range from 20 to 80% by weight;

(II) copolymer of ethylene, vinyl acetate, and at least one of acrylate monomer and methacrylate monomer, in which a vinyl acetate content is in a range from 20 to 80% by weight, and a content of the at least one of the acrylate monomer and methacrylate monomer is in a range from 0.01 to 10% by weight; and;

(III) copolymer of ethylene, vinyl acetate, and at least one of maleic acid and maleic anhydride, in which a vinyl acetate content is in a range from 20 to 80% by weight, and a content of the at least one of maleic acid and maleic anhydride is in a range from 0.01 to 10% by weight.

* * * * *